US012468853B2

(12) United States Patent
Palanki

(10) Patent No.: US 12,468,853 B2
(45) Date of Patent: Nov. 11, 2025

(54) SENSITIVE DATA LEAKAGE PROTECTION

(71) Applicant: AMERICAN EXPRESS TRAVEL RELATED SERVICES COMPANY, INC., New York, NY (US)

(72) Inventor: Hiranmayi Palanki, Tampa, FL (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 46 days.

(21) Appl. No.: 18/390,091

(22) Filed: Dec. 20, 2023

(65) Prior Publication Data

US 2025/0209207 A1    Jun. 26, 2025

(51) Int. Cl.
*G06F 21/62* (2013.01)
*G06N 3/094* (2023.01)

(52) U.S. Cl.
CPC ......... *G06F 21/6263* (2013.01); *G06N 3/094* (2023.01)

(58) Field of Classification Search
CPC .............................. G06F 21/6263; G06N 3/094
See application file for complete search history.

(56) References Cited

U.S. PATENT DOCUMENTS

| 11,615,208 | B2 * | 3/2023 | Truong | G06F 8/71 |
| | | | | 706/25 |
| 12,299,583 | B2 * | 5/2025 | Walters | G06N 3/044 |
| 2024/0330090 | A1 * | 10/2024 | Mandal | G06F 11/0769 |

* cited by examiner

*Primary Examiner* — Sm A Rahman
(74) *Attorney, Agent, or Firm* — STERNE, KESSLER, GOLDSTEIN & FOX P.L.L.C.

(57) ABSTRACT

Disclosed herein are system, method, and computer program product embodiments for increasing data security by using generative adversarial networks (GAN) and transformer models to detect sensitive data leakage. A transformer model may receive a message via a network. The transformer model may then apply a GAN model to determine whether the message contains potentially sensitive data requiring further inspection. If the message contains potentially sensitive data, the transformer model may determine sensitive data types may be included in the message and the likelihood that sensitive data is present. Based on the transformer model's determination, a blocking policy may be applied to prevent sensitive data leakage.

18 Claims, 13 Drawing Sheets

SENSITIVE DATA LEAKAGE PROTECTION

BACKGROUND

Field

This field is generally related to increasing data security using generative adversarial networks and transformer models to detect and prevent sensitive data leakage.

Related Art

Some enterprise computing systems have migrated away from large, monolithic service architectures, to microservice architectures. A microservice architecture leverages several different components, each built around performing a limited set of functions. However, the proliferation of microservices also means that data is now being passed through hundreds or even thousands of endpoints. Businesses that store sensitive data and provide user access to their microservices through gateways (e.g., API's), however, may experience microservices that potentially leak sensitive data when responding to requests. This may include encountering high rates of false positives and introduce significant latency.

BRIEF SUMMARY

Disclosed herein are system, apparatus, device, method and/or computer program product embodiments, and/or combinations and sub-combinations thereof, for increasing data security by using generative adversarial networks and transformer models to detect and prevent sensitive data leakage. This disclosure describes a sensitive data management system that prevents access to protected data by unauthorized parties. The sensitive data management system may prevent sensitive data leakage from microservices. The sensitive data management system may increase data security using generative adversarial networks and transformer models to detect and prevent sensitive data leakage. Upon detecting a potential sensitive data leak, a blocking policy may be applied to prevent proliferation of the sensitive data.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
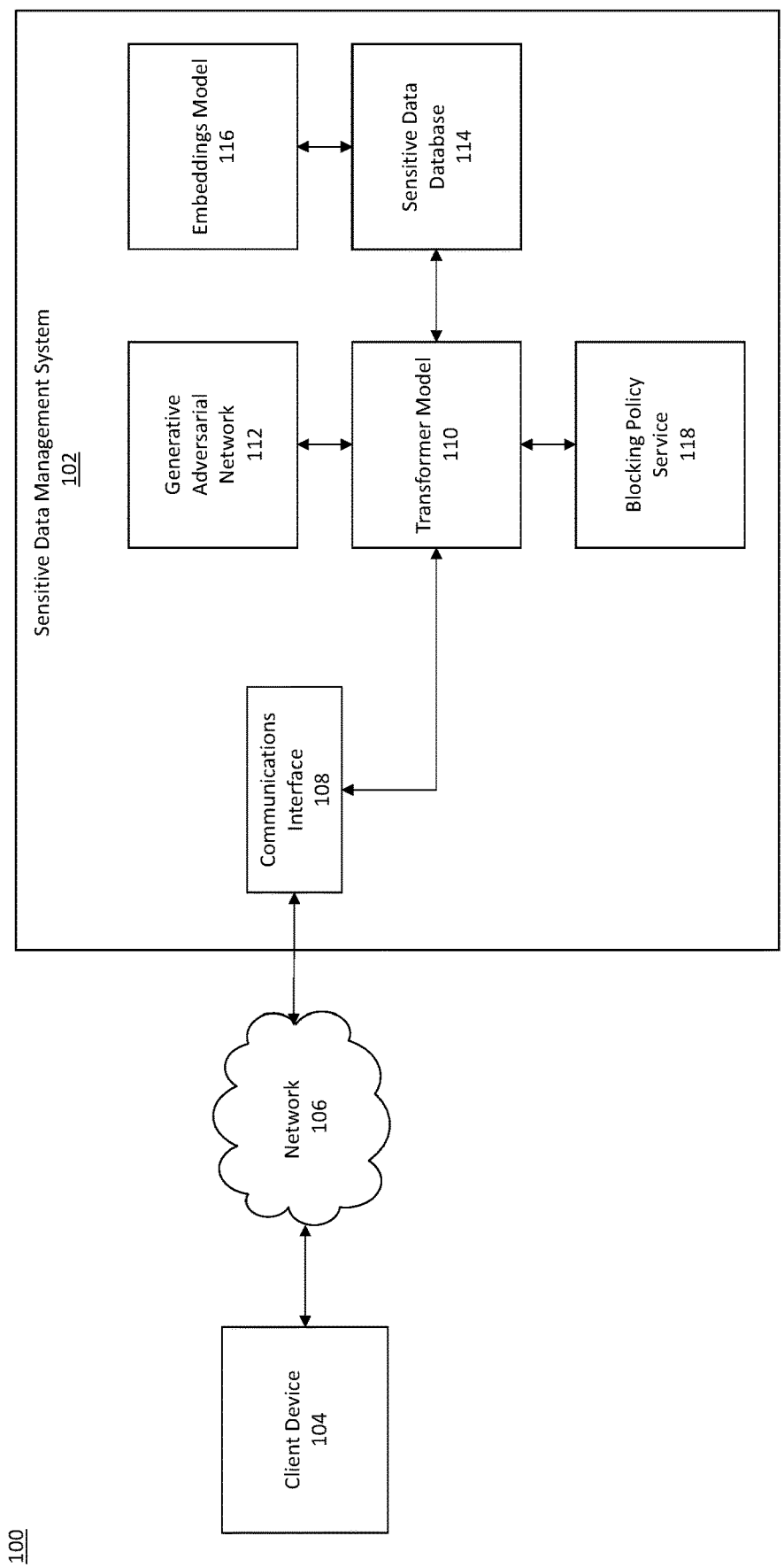
FIG. 1 depicts a block diagram of a sensitive data management environment, according to some embodiments.

Provided herein are system, apparatus, device, method and/or computer program product embodiments, and/or combinations and sub-combinations thereof, for increasing data security by using generative adversarial networks and transformer models to detect and prevent sensitive data leakage. Upon detecting a potential sensitive data leak, a blocking policy may be applied to prevent proliferation of the sensitive data.

The sensitive data management system described herein may detect and prevent sensitive data leakage. This may prevent sensitive data from being accessed by unauthorized parties. This may also aid in preventing microservices from leaking sensitive data as well. For example, the sensitive data management system may prevent a microservice responding to a customer's API request from inadvertently including a credit card number belonging to a different customer.

Current systems may attempt to detect sensitive data by using regular expression matching. Regular expressions, however, may lack nuance. A regular expression may not be able to detect the difference between a sixteen digit number that is a credit card number, and one that is not. Regular expressions may also lack precision when providing binary results. For example, this may occur when detecting whether there was a match or not. Regular expressions may also be computationally slow. For example, regular expression techniques may be applied to an entire input, and may not be able to detect the importance of certain features over others.

To address such issues, sensitive data management system described herein leverages generative adversarial networks (GANs) and transformer models to detect sensitive data leakage. This may also reduce false positive rates, provide increased insight, and/or increase system performance. The sensitive data management system may be used in any system where data is being passed between endpoints. For example, a customer may use a mobile application to access data regarding their account. The sensitive data management system may be positioned to scan the response to ensure that the response does not contain any sensitive data. For example, the scan may confirm that the response is not meant to be sent to the customer. Additionally, the sensitive data management system may apply to API communications. For example, an API endpoint accessible by customers may query internal API endpoints that are not accessible by customers. The sensitive data management system may be positioned between external and internal endpoints, ensuring that messages passed to external endpoints do not contain sensitive data. The sensitive data management system may also be implemented as part of a continuous integration pipeline to detect sensitive data in committed source code before it is published to production.

Once a message is received, the sensitive data management system may apply GAN and transformer models to the message to determine whether it contains sensitive data. For example, a GAN model may be applied to determine whether the message contains sensitive data occurring in a live or production scenario. For example, this may be "real" sensitive data as opposed to test or expired data. If the message contains live sensitive data, a transformer model may then be applied. The transformer model may be trained to detect various types of sensitive data in messages. The transformer model may also query a database storing different types of known sensitive data. The message may be compared to the database entries to determine its similarity to each entry. Based on the similarities, a blocking policy may be applied.

The blocking policy may include discarding the message, thereby preventing the sensitive data from being transmitted to or accessed by unauthorized parties. The blocking policy may also contain instructions such as storing the message at a secure location so that the message can be inspected later. The blocking policy may also remove detected sensitive data and then allow the message to continue on its path.

Various embodiments of these features will now be discussed with respect to the corresponding figures.

FIG. 1 depicts a block diagram of a sensitive data management environment 100, according to some embodiments. Sensitive data management environment 100 includes client device 104, network 106, and sensitive data management system 102. Sensitive data management system 102 may include communication interface 108, transformer model 110, GAN 112, sensitive data database 114, embeddings model 116, and/or blocking policy service 118. Sensitive data management system 102 may be implemented using one or more servers and/or databases. In some embodiments, sensitive data management system 102 may be implemented using a computing device such as a desktop workstation, laptop or notebook computer, netbook, tablet, smart phone, and/or other computing device. In some embodiments, sensitive data management system 102 may be implemented as an application in an enterprise computing system and/or a cloud-computing system. In some embodiments, sensitive data management system 102 may be a computer system such as computer system 1200 described with reference to FIG. 12.

Client device 104 may be any entity attempting to access information that is routed through sensitive data management system 102. Client device 104 may be a computer system such as computer system 1200 described with reference to FIG. 12. Client device 104 may be a client system such as a desktop workstation, laptop or notebook computer, netbook, tablet, smart phone, and/or other computing device that may be using an enterprise computing system.

Client device 104 may also be configured to send messages to and receive messages from sensitive data management system 102. For example, client device 104 may be used by a customer of an organization attempting to access their account information. In some embodiments, client device 104 may be part of the same enterprise computing system or cloud computing system as sensitive data management system 102. For example, client device 104 may be an API endpoint that is handling an API call. Client device 104 may be connected to network 106.

Network 106 may be any type of computer or telecommunications network capable of communicating data, for example, a local area network, a wide-area network (e.g., the Internet), or any combination thereof. The network may include wired and/or wireless segments. In some embodiments, network 106 may be a secure network. In some embodiments, client device 104 may reside within network 106. In some embodiments, client device 104 may reside outside network 106.

Communications interface 108 may be configured to communicate with client device 104 via network 106. Communications interface 108 may comprise any suitable network interface capable of transmitting and receiving data, such as, for example a modem, an Ethernet card, a communications port, or the like. Communications interface 108 may be able to transmit data using any wireless transmission standard such as, for example, Wi-Fi, Bluetooth, cellular, or any other suitable wireless transmission. Communications interface 108 may also be in communication with transformer model 110. Transformer model 110 may be a machine learning model. Transformer model 110 may be trained to detect whether a certain message contains sensitive data. In some embodiments, transformer model 110 may produce a binary result (e.g., true or false), as to whether the message contains sensitive data. In some embodiments, transformer model 110 may produce a probability distribution. The probability distribution may include each sensitive data type and a corresponding likelihood that the message contains the sensitive data type. Transformer model 110 may be configured to create vector representations of the received messages. This may involve transforming or encoding the text in the received message into a numerical format so that the information can be processed. Transformer model 110 may be in communication with GAN 112 in order to obtain additional intelligence as to whether a message contains sensitive data.

GAN 112 may be used to reduce the number of false positives that are produced. GAN 112 may accomplish this task by being trained to discern between true sensitive data items and false positive sensitive data items. True sensitive data items may be those that originated from client device 104. For example, a true positive data item may be a message generated in response to an API request made by client device 104. A false positive may be a message that appears to contain sensitive data, but in fact, does not. For example, although a credit card number has sixteen digits, not every sixteen digit number is a credit card number. Thus, a message containing a sixteen digit number that is not, in fact, a credit card number, is a false positive.

Another example of a false positive is a message that includes expired sensitive data. For example, client device 104 may be assigned a secure shell (SSH) key to access an API endpoint. The SSH key may be deactivated after a specified time has passed. Therefore, if client device 104 attempts to use the deactivated SSH key, it will not work. However, since the SSH key is expired, it may no longer be considered sensitive data because it would not be usable by an unauthorized party. A regular expression technique may flag this message as containing sensitive data that needs to be discarded or scrubbed from the message. However, this would unnecessarily use up valuable network resources. In contrast, GAN 112 would recognize that the SSH keys are expired, and therefore the message does not need to be processed further. GAN 112 may send its determinations to transformer model 110. This may allow for machine learning decisions and/or re-training of the transformer model 110. Transformer model 110 may also be in communication with sensitive data database 114.

Sensitive data database 114 may be used to store vector representations of sensitive data types. In some embodiments, sensitive data types may include usernames, passwords, social security numbers, credit card numbers, employee identifier, encryption and decryption keys (e.g., SSH keys, certificate private keys, etc.), API keys, active directory credentials, service account credentials, privileged access credentials, and/or other sensitive data elements.

Sensitive data database 114 may be implemented using a memory storage device. Sensitive data database 114 may be organized according to any suitable means. For example, sensitive data database 114 may be organized into key-value pairs, where the sensitive data type is the key and its corresponding vector representation is the value. Sensitive data database 114 may also be organized as a hierarchical database. In this embodiment, data types at the top of the hierarchy constitute a superset of the sensitive data types beneath them. For example, user login credentials may be one sensitive data type. However, login credentials may comprise two sub-data types, a username and a password. In this example, sensitive data database 114 would have an entry for login credentials with its own vector representation, and beneath that would be two entries, one for a username and one for a password, each also having their own vector representation. Sensitive data database 114 may be in communication with embeddings model 116.

Embeddings model 116 may be responsible for generating vector representations of one or more sensitive data types and storing the vector representations in sensitive database 114. Storing the vector representations of each sensitive data type allows received messages to be quickly compared against each stored vector representation. For example, storing the textual representations of sensitive data types may require converting the text to a numerical vector representation for each comparison. This may lead to computer resource inefficiencies and/or increase the time to inspect each message. By storing the numerical vector representation of each sensitive data type, the comparisons may be performed much faster. This comparison may be performed by calculating, for example, the cosine similarity between the vector representation of a received message and the stored vector representation of each sensitive data type. As another example, a nearest neighbor search could be performed to identify similar vector representations.

Embeddings model 116 may also add vector representations for new types of sensitive data to sensitive data database 114. For example, a type of data not considered sensitive may subsequently be updated to be considered sensitive. As another example, a new data type may be integrated into sensitive data management environment 100 and may be considered sensitive. For example, passwords are usually text based, and would likely be considered sensitive. However, biometric data may also be used to function as an authentication token, similar to a password. If biometric data is integrated into sensitive data management environment 100, it may be considered sensitive. Embeddings model 116 may create a vector representation of biometric data and add it to sensitive data database 114.

When sensitive data database 114 is updated, transformer model 110 may be trained on the updated data in sensitive data database 114. This allows for transformer model 110 to detect new and updated sensitive data types that may be sent by communications interface 108. In addition to generating its own sensitive data predictions, transformer model 110 may also query sensitive data database 114 to determine the similarity between a received message and each entry in sensitive data database 114. This query feature may be turned on or off, based on various factors. For example, if network 106 is experiencing high latency due to a large number of messages, the query feature may be disabled so that messages are processed faster. In another embodiment, the query feature may be utilized based on transformer model 110's prediction. For example, if transformer model 110's prediction is between a predefined threshold range (e.g., 50-60%), this may mean that the transformer model is "unsure" about whether the message contains sensitive data. Therefore, the query feature may be used as an additional layer of security to bolster transformer model 110's decision. The query feature may also be used in a situation where new data types have been added to sensitive data database 114, but transformer model 110 may not yet have been trained on that new data. In this instance, transformer model 110 may consult sensitive data database 114 to determine whether any received messages include the new sensitive data types.

Figure 2A:
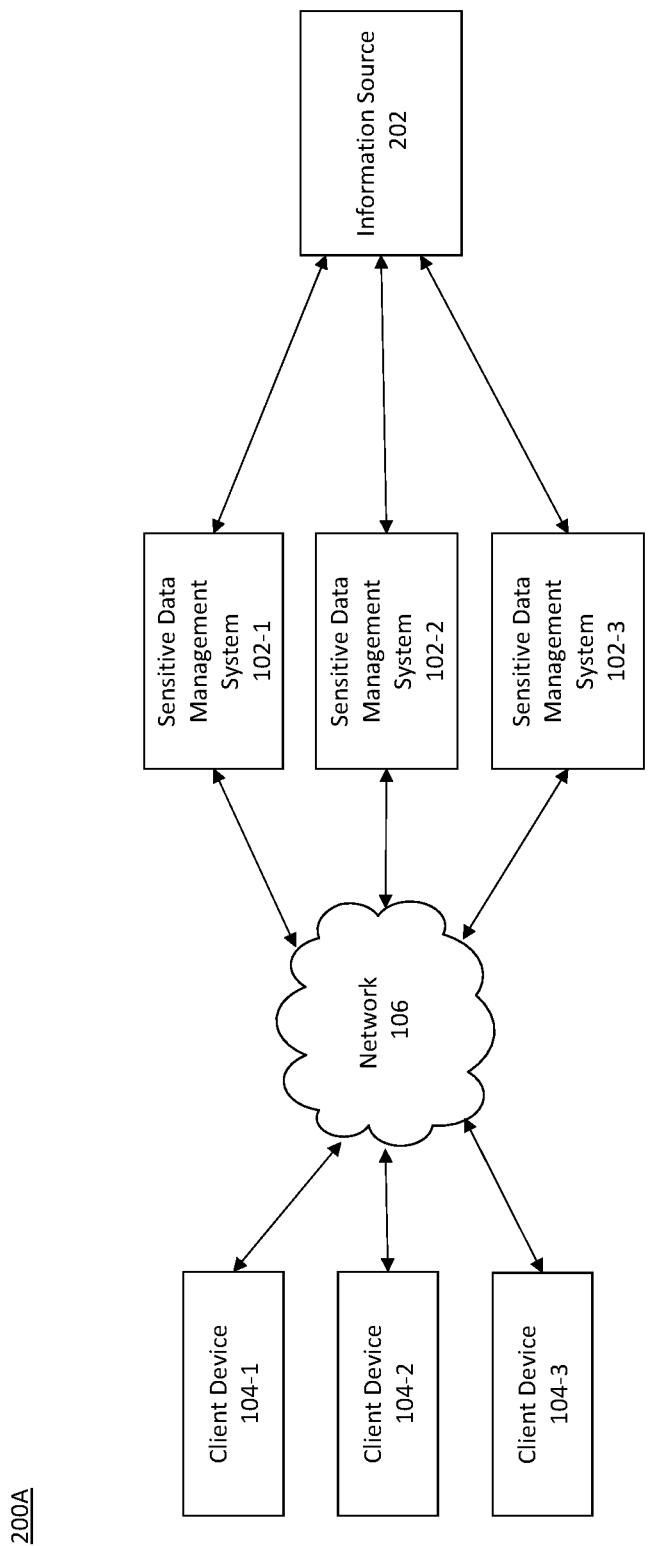
FIG. 2A depicts a sensitive data environment with an information source, according to some embodiments.

FIG. 2A depicts a sensitive data environment 200A with an information source 202, according to some embodiments. As illustrated in FIG. 2A, multiple client devices 104 may be in communication with multiple sensitive data management systems 102. Environment 200A also includes information source 202. Information source 202 may be a computer system such as computer system 1200 described with reference to FIG. 12. For example, information source 202 may be implemented using one or more servers and/or databases.

Information source 202 may represent a storage system and/or memory including data accessible via network 106. For example, information source 202 may contain a source code repository and client device 104-1 may be a device operated by a software engineer. In this example, when client device 104-1 requests to commit code to the repository, a sensitive data management system 102-1 can inspect the code to ensure that no sensitive data is present. Information source 202 may also contain account information for a customer of an organization, such as client device 104-2. In this instance, when client device 104-2 attempts to access its account information, sensitive data management system 102-1 may inspect the messages between client device 104-2 and information source 202 to ensure that sensitive data is not being leaked. Although only one information source 202 is illustrated, environment 200A may include multiple information sources 202.

Employing multiple sensitive data management systems 102, as shown in environment 200A, may improve the performance of sensitive data leakage protection. Configuring multiple sensitive data management systems 102 may be advantageous to reduce latency in detecting sensitive data leakage. For example, if the messages from client devices 104 go through a single sensitive data management system 102, the single sensitive data management system 102 may cause a bottleneck and slow down the message throughput. However, by creating multiple sensitive data management systems 102 operating in parallel, each sensitive data management system 102 can inspect one or more batches of messages, thereby reducing the overall latency. Messages may be routed to certain sensitive data management systems 102 based on various techniques or metrics. For example, messages may be routed according to a round-robin configuration where each message is sent to a different sensitive data management system 102 to prevent a single sensitive data management system 102 from being overwhelmed. In some embodiments, metrics, such as sensitive data management system 102 response time, may be used to route messages to different systems 102.

Figure 2B:
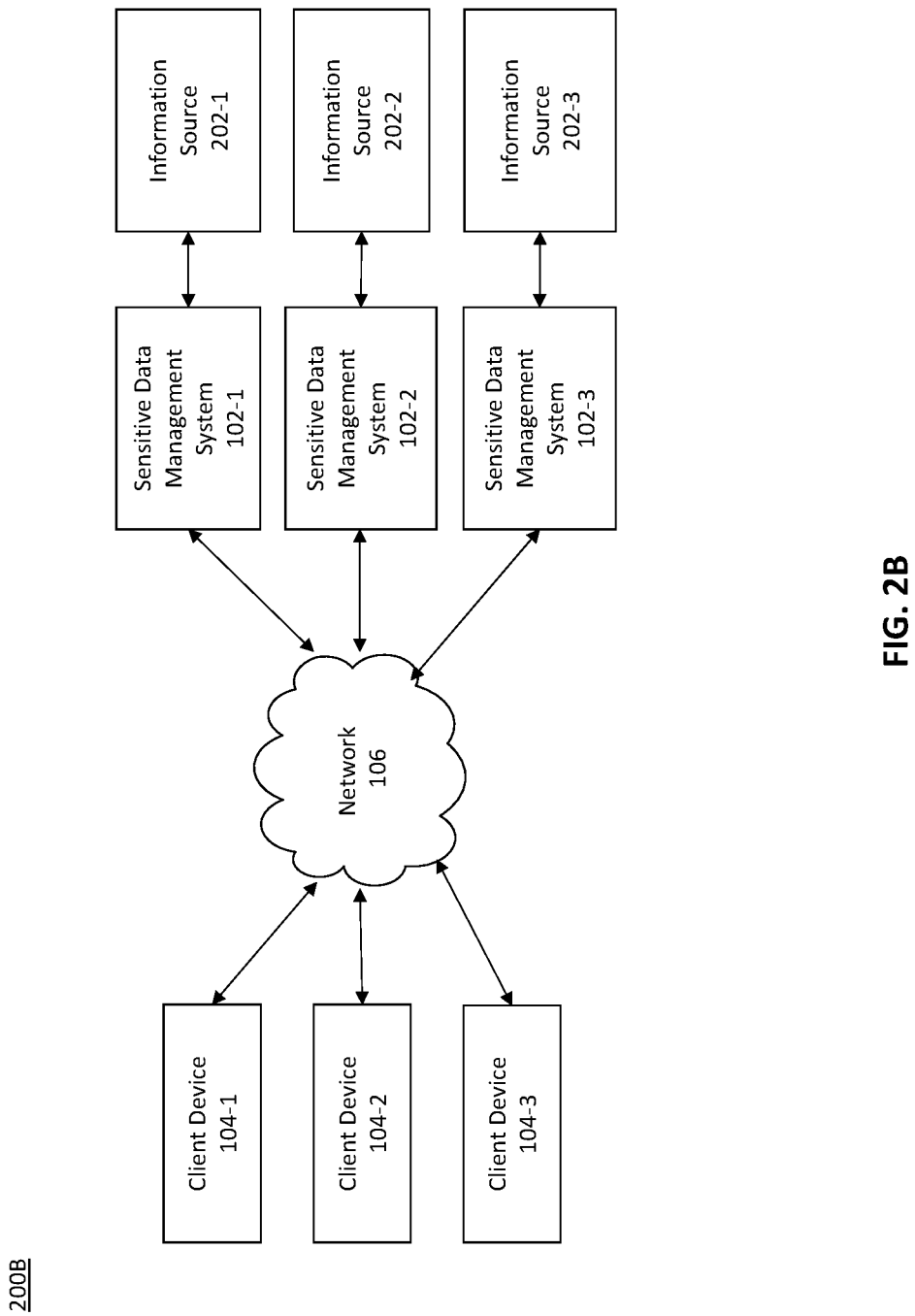
FIG. 2B depicts a sensitive data environment with multiple information sources, according to some embodiments.

FIG. 2B depicts sensitive data environment 200B with multiple information sources, according to some embodiments. In FIG. 2B, each sensitive data management system 102 is assigned to a specific information source 202. For example, sensitive data management system 102-1 is assigned to information source 202-1 and is responsible for ensuring no sensitive data leaks from information source 202-1. This configuration may be beneficial because each sensitive data management system 102 can be tailored to detect data associated with the corresponding information source 202. For example, information source 202-1 may store customer account information. Therefore, sensitive data management system 102-1 may be configured to detect sensitive data associated with customer accounts (e.g., routing number, account number, etc.). As a result, GAN 112 and transformer model 110 at sensitive data management system 102-1 may be trained on data involving customer account information. Additionally, sensitive data database 114 at sensitive data management system 102-1 may store sensitive data types associated with customer accounts. This configuration may reduce the overall latency associated with sensitive data leakage protection because it may prevent bottlenecks that may occur if there was only one sensitive data management system 102. Additionally, each sensitive data management system 102 can maintain a smaller sensitive data database 114, thus reducing the amount of stored items and/or data that is inspected during a query.

Figure 3:
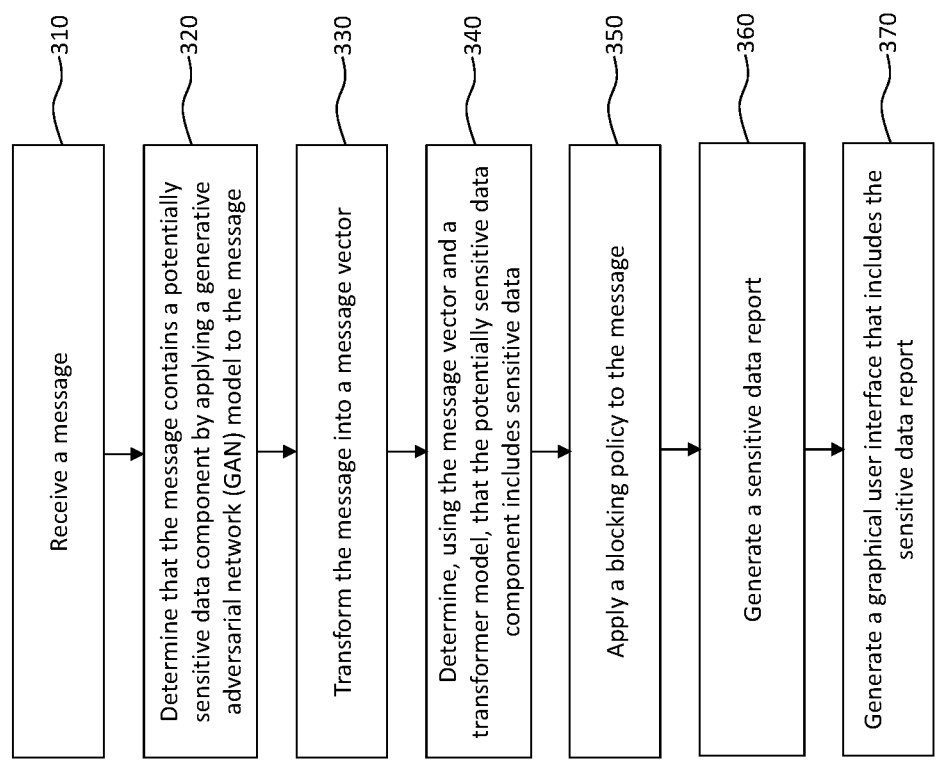
FIG. 3 depicts a flowchart illustrating a method for managing sensitive data leakage, according to some embodiments.

FIG. 3 depicts a flowchart illustrating a method 300 for managing sensitive data leakage, according to some embodiments. Method 300 shall be described with reference to FIG. 1, however, method 300 is not limited to that example embodiment.

In an embodiment, sensitive data management system 102 may utilize method 300 to determine whether a received message contains sensitive data. If the message does contain sensitive data, a blocking policy may be applied. The foregoing description will describe an embodiment of the execution of method 300 with respect to sensitive data management system 102. While method 300 is described with reference to sensitive data management system 102, method 300 may be executed on any computing device, such as, for example, the computer system described with reference to FIG. 12 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3.

At 310, sensitive data management system 102 receives a message. In some embodiments, communications interface 108 may receive the message at sensitive data management system 102. The message may originate from client device 104. As explained above, client device 104 may be an internal entity such as an API endpoint responding to a response, or client device 104 may be an external entity such as a customer's device attempting to access data. For example, this may be customer device attempting to access account data.

Communications interface 108 may transmit the message to transformer model 110. Communications interface 108 may transmit the message via any desirable method. For example, communications interface 108 may communicate the message to transformer model 110 via a network connection. In another embodiment, communications interface 108 may place the message on a queue that transformer model 110 reads from.

At 320, sensitive data management system 102 applies a GAN 112 model to the message to determine whether the message contains a potentially sensitive data component. Sensitive data may include a social security number, a username, a password, passport number, driver's license number, an account number, and/or other types of sensitive data. For example, sensitive data management system 102 may use GAN 112 to make the determination. As described above, GAN 112 is trained to identify false positives. A false positive may be data that may appear to be sensitive, but in fact, is not. For example, an expired password may appear to be sensitive, but in fact is not because it cannot be used to gain access to systems or confidential data. In this case, GAN 112 may determine that the message does not contain sensitive data.

At 330, sensitive data management system 102 transforms the message into a message vector. The message vector may be based on the content of the message. For example, transformer model 110 may be configured to create vector representations of the received messages. This may involve transforming or encoding the text in the received message into a numerical format so that the information can be processed. Sensitive data management system 102 may transform the message using various algorithms, such as Word2Vec, one-hot encoding, and/or integer encoding.

At 340, sensitive data management system 102 may determine, using the message vector and a transformer model, that the potentially sensitive data component includes sensitive data. This may be accomplished by applying the message to a transformer model, such as transformer model 110 as described at 330 and/or querying a database, such as sensitive data database 114. For example, sensitive data management system 102 may apply the message vector to the transformer model 110. Sensitive data management system 102 may compare the message vector to one or more vectors stored in sensitive data database 114 as previously explained. The one or more vectors in sensitive data database 114 may each correspond to a type of sensitive data. In response to the comparison, sensitive data management system 102 may identify a type of sensitive data. This may occur based on identifying a matching vector. This may also indicate the type of sensitive data that is included in the message.

At 350, sensitive data management system 102 may apply a blocking policy based on determining the message contains sensitive data. Sensitive data management system 102 may apply the blocking policy based on the type of sensitive data determined in 340. Sensitive data management system 102 may use blocking policy service 118 to determine which blocking policy to apply. In one embodiment, the blocking policy may be configured to discard the message. In another embodiment, the blocking policy may be configured to remove the sensitive data from the message and allow the message to continue.

The blocking policy may take certain actions based on similarity metrics generated by transformer model 110 when determining whether sensitive data was detected. For example, the blocking policy may require a threshold similarity to be met before any action is taken. For instance, the blocking policy may discard a message if the similarity to any sensitive data type is greater than 70%. The blocking policy may apply different thresholds to different sensitive data types. For example, certain sensitive data types may be deemed higher priority than others. A higher priority may indicate that if such data is leaked, the consequences may be worse. Therefore, lower thresholds may be assigned to higher priority sensitive data types in an effort to prevent leakage. For instance, social security numbers may be deemed higher priority than usernames. Therefore, the blocking policy may discard a message if there is a 40% or greater similarity to social security numbers. However, the same policy may have a 75% or greater similarity threshold for usernames before discarding the message.

At 360, sensitive data management system 102 may generate a sensitive data report including one or more sensitive data types respectively corresponding to each of one or more vectors and a similarity value of each of the one or more vectors to the message vector. The sensitive data report may also include a sensitive data type based on applying the message vector to transformer model 110. Sensitive data management system 102 may generate the sensitive data report once it determines the message contains sensitive data. As discussed above, sensitive data management system 102 may compare the message vector to one or more vectors stored in sensitive data database 114. The one or more vectors in sensitive data database 114 may each correspond to a type of sensitive data. In embodiments, the comparison may include determining a similarity value between the message vector and the one or more vectors in sensitive data database 114. The sensitive data report may include the sensitive data type of each vector and the corresponding similarity score.

For example, the message vector may have been compared to different sensitive data types. These may include certificate private keys; API keys; SSH keys; encryption/decryption keys; active director credentials; credit card number; social security number; and/or other sensitive data types. Each sensitive data type may have a similarity value to the message vector. The similarity value may be denoted as a percentage (e.g., 90%). In some embodiments, sensitive data management system 102 may be configured to list certain sensitive data types, or sensitive data types with a corresponding similarity value or similarity score greater than a certain percentage. For example, sensitive data types with similarity values greater than 50% may be listed on the sensitive data report. This may be useful in a situation where there is uncertainty as to whether the message contains sensitive data, and so the message along with the sensitive data report can be saved for later inspection. Sensitive data management system 102 may store sensitive data report in a database.

At 370, sensitive data management system 102 may generate a graphical user interface (GUI) that includes the sensitive data report. Sensitive data management system 102 may transmit GUI data to client device 104 for display. The GUI may allow client device 104 to view and/or display the sensitive data report. In an embodiment, sensitive data management system 102 may cause the GUI to display the sensitive data report and the message, so that client device 104 can compare the two. For example, the sensitive data management system 102 may highlight, within the GUI, a part of the message and the corresponding sensitive data type listed in the sensitive data report. This may be beneficial so that client device 104 can attempt to determine what sensitive data was included in the message and what steps can be taken to prevent it from reoccurring.

Figure 4:
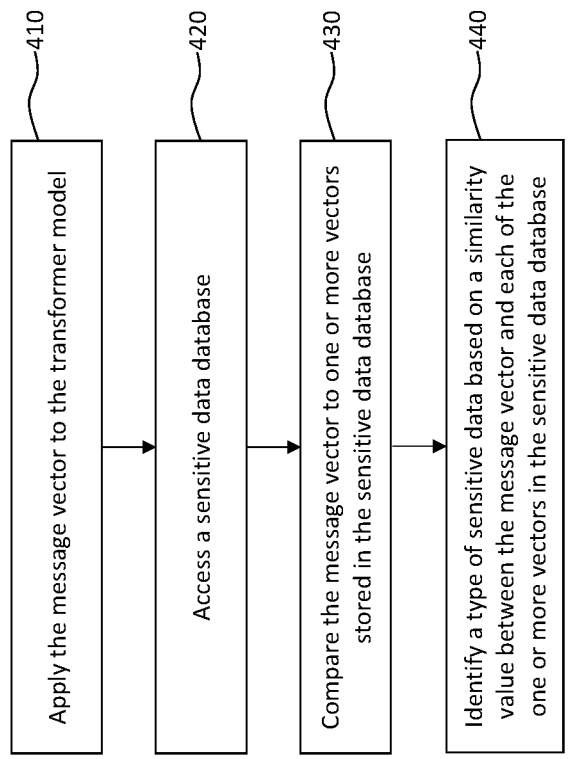
FIG. 4 depicts a flowchart illustrating a method for applying a transformer model to a message, according to some embodiments.

FIG. 4 depicts a flowchart illustrating a method 400 for applying a transformer model to a message, according to some embodiments. Method 400 may include additional details related to 340 as described with reference to method 300. Method 400 shall be described with reference to FIG. 1; however, method 400 is not limited to that example embodiment.

In an embodiment, sensitive data management system 102 may utilize method 400 to determine whether a message contains sensitive data. Sensitive data management system 102 may make this determination by applying a transformer model and querying a sensitive data database 114. The foregoing description will describe an embodiment of the execution of method 400 with respect to sensitive data management system 102 and/or method 300. While method 400 is described with reference to sensitive data management system 102, method 400 may be executed on any computing device, such as, for example, the computer system described with reference to FIG. 12 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4.

At 410, sensitive data management system 102 applies the message vector to transformer model 110. This may occur following 330 as described with reference to FIG. 3. This determination may be accomplished by transforming the message into a vector format. Sensitive data management system 102 may transform the message using various algorithms, such as Word2Vec, one-hot encoding, and/or integer encoding. Once the message is in a numerical format, the message vector may be applied to transformer model 110. The output of this application may be a probability value indicating whether the message contains sensitive data. As an additional layer of security, sensitive data management system 102 may use a database such as sensitive data database 114, to determine whether the message contains sensitive data.

At 420, sensitive data management system 102 may access a database such as sensitive data database 114. As previously explained, sensitive data database 114 may include vector representations corresponding to different types of sensitive data.

At 430, sensitive data management system 102 compares the message vector to one or more vectors stored in the sensitive data database 114. Each of the one or more vectors may correspond to a type of sensitive data. Since the message has already been converted to a vector, and entries in sensitive data database 114 are stored as vectors, sensitive data management system 102 can compute the similarity by applying one or more similarity algorithms. Both the message vector and the vectors in sensitive data database 114 may have certain dimensions. In some embodiments, the dimensions of the message vectors and the vectors in sensitive data database 114 may be different. In some embodiments, the dimensions of the message vectors and the vectors in sensitive data database 114 may be the same.

At 440, sensitive data management system 102 identifies a type of sensitive data based on a similarity value determined based on the comparison between the message vector and each of the one or more vectors in the sensitive data database 114. To determine the similarity between a message vector and vectors stored in the sensitive database, sensitive data management system 102 may employ various algorithms. For example, sensitive data management system 102 may compute the cosine similarity between the message vector and each entry in sensitive data database 114. As another example, sensitive data management system 102 may perform a nearest neighbor search to locate an entry in sensitive data database 114 that is most similar or has the highest similarity to the message. The identified type of sensitive data may be the entry or vector in the sensitive data database 114 with the highest similarity value to the message vector. Based on the identified type, sensitive data management system 102 may apply a blocking policy as described with reference to 350 and FIG. 3.

Figure 5:
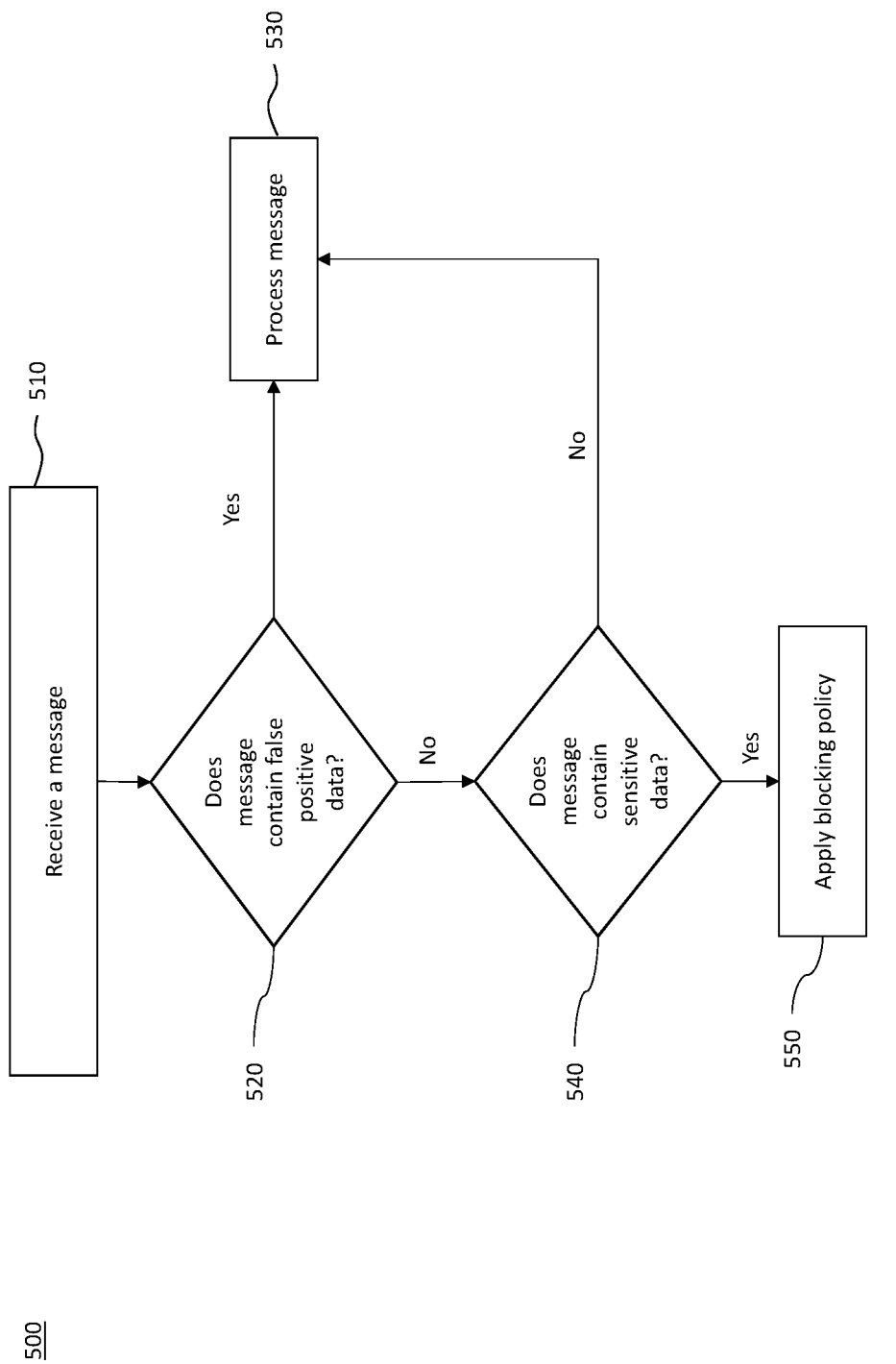
FIG. 5 depicts a flowchart illustrating a method for applying a blocking policy, according to some embodiments.

FIG. 5 depicts a flowchart illustrating a method 500 for applying a blocking policy, according to some embodiments. Method 500 shall be described with reference to FIG. 1, however, method 500 is not limited to that example embodiment.

In an embodiment, sensitive data management system 102 may use method 500 to apply a blocking policy based on whether the message contains sensitive data. The foregoing description will describe an embodiment of the execution of method 500 with respect to sensitive data management system 102. While method 500 is described with reference to sensitive data management system 102, method 500 may be executed on any computing device, such as, for example, the computer system described with reference to FIG. 12 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 5.

At 510, sensitive data management system 102 receives a message. The message may have a destination residing outside of a network. In some embodiments, communications interface 108 at sensitive data management system 102 may receive the message. At 520, the message is inspected to determine whether it contains false positive data. False positive data may include fake data, test data, expired data, and/or data that may seemingly be sensitive but is not. False positive data may be contrasted with potentially sensitive data. In some embodiments, false positive data may refer to data created by a GAN, such as GAN 112, for development purposes. This embodiment will be discussed further below. False positive data may also refer to test data may be data used by system engineers to test the functioning of parts of sensitive data management system 102 or other entities connected to network 106. However, if this testing is not meant to detect sensitive data, then using resources to apply a blocking policy to the message should be avoided. False positive data may also refer to expired data. Expired data may be data that is no longer valid, and thus poses little to risk if it is leaked. For example, SSH keys that have expired can no longer be used, and thus pose little risk if they are leaked to an entity not entitled to view them. If the message contains false positive data, the process proceeds to 530 where the message is processed. For example, the message may be allowed to proceed to its destination.

Returning to 520, sensitive data management system 102 may determine that the message does not contain false positive data. In this case, the message may contain potentially sensitive data (e.g. not fake, test, or expired data) and the process proceeds to 540. At 540, sensitive data management system 102 determines whether the message contains sensitive data. Sensitive data management system 102 may inspect the message and to determine whether the potentially sensitive data is in fact sensitive.

This determination may be made by sensitive data management system 102 using methods 300 and/or 400 as described with reference to FIG. 3 and FIG. 4 respectively. Sensitive data management system 102 may use a transformer model, such as transformer model 110 to make this determination. Sensitive data management system 102 may train the transformer model to detect whether a message contains sensitive data. Sensitive data management system 102 may also query a database, such as sensitive data database 114, to determine if any of the contents of the message match any entries in the database. If the message does not contain sensitive data, the message is processed at 530. For example, the message may be allowed to proceed to its destination. If the message does contain sensitive data, then a blocking policy may be applied at 550, as discussed with reference to FIG. 3.

Figure 6:
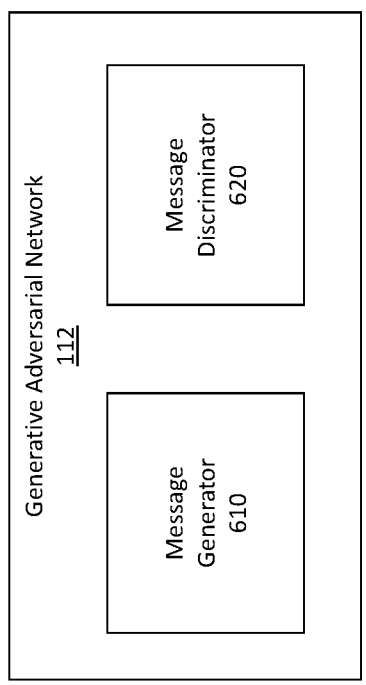
FIG. 6 depicts a block diagram of a generative adversarial network (GAN), according to some embodiments.

FIG. 6 depicts a block diagram of a generative adversarial network (GAN) 112, according to some embodiments. GAN 112 may be a model that includes message generator 610 and message discriminator 620. Message generator 610 and/or message discriminator 620 may be machine learning models.

Message generator 610 may be a model optimized to generate messages that appear real (e.g., sample messages or fake messages). For example, message generator 610 may be optimized to generate messages that appear as if they originated from client device 104. Message discriminator 620 may be optimized to determine, for a given message, whether it was generated by message generator 610. During training, message discriminator 620 may be updated in response to features associated with messages created by message generator 610 and those that were not. As a result, message discriminator 620 may be trained, re-trained, and/or used to effectively screen out false positive message that do not require further inspection.

Figure 7:
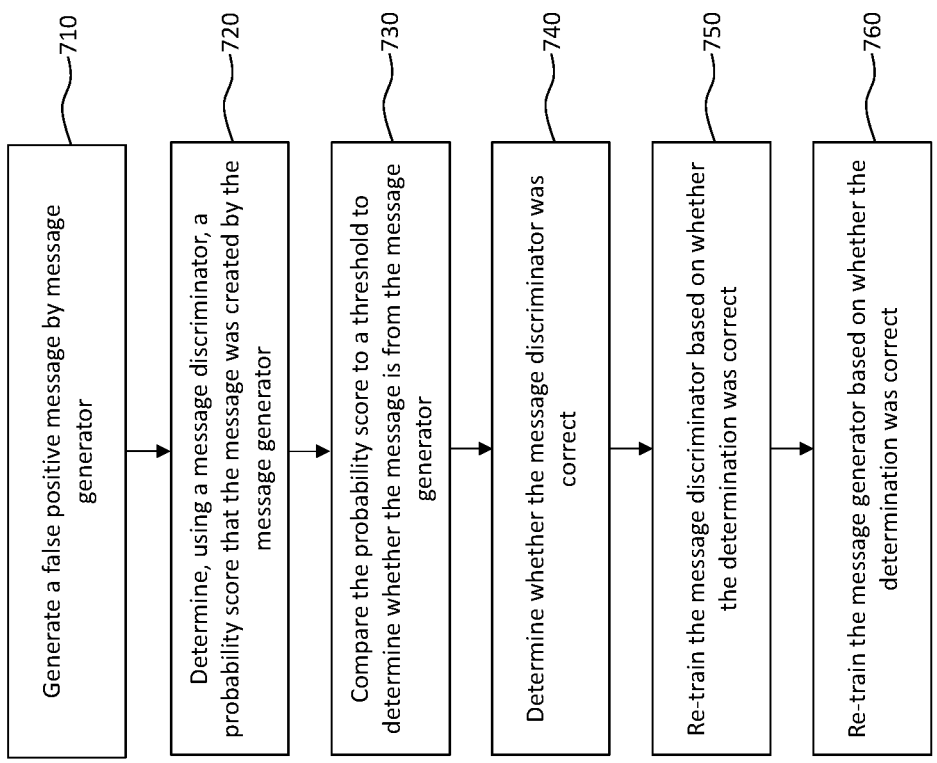
FIG. 7 depicts a flowchart illustrating a method for training a GAN model, according to some embodiments.

FIG. 7 depicts a flowchart illustrating a method 700 for training a GAN, according to some embodiments. For example, method 700 may be used by sensitive data management system 102 to train GAN 112. Method 700 shall be described with reference to FIG. 6, however, method 700 shall not be limited to that example embodiment.

In an embodiment, sensitive data management system 102 may utilize method 700 to train a GAN model to identify messages containing false positive sensitive data elements that do not need further processing. The foregoing description will describe an embodiment of the execution of method 700 with respect to sensitive data management system 102. While method 700 is described with reference to sensitive data management system 102, method 700 may be executed on any computing device, such as, for example, the computer system described with reference to FIG. 12 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 7.

At 710, message generator 610 generates a false positive message. A false positive message may be a message with data that appears to be sensitive, but is not. For example, a sixteen digit number may appear to be a credit card number, but in fact, is not. A false positive message may also be one that contains expired credentials. For example, the message may contain fields for "username" and "password." On its face, this message appears to be leaking sensitive data, but since the credentials are expired, there is no need to apply a blocking policy. As stated above, message generator 610 may be optimized to generate messages that appear authentic (e.g., as if they came from client device 104). As further explained herein, the false positive message generated by GAN 112 may be enhanced via re-training message generator 610. At the beginning of training, message generator 610 may be initialized with random values.

At 720, message discriminator 620 determines a probability score indicating whether the message was created by message generator 610. The probability score may be based on a set of weights associated with each class (e.g., whether the message originated from message generator 610 or not). The weights may correspond to one or more message features. This score may indicate a detection of whether message generator 610 created a false positive message and/or whether a message was captured from a live scenario.

At 730, the probability score is compared to a threshold to determine whether the message is from message generator 610. For example, if the probability score is greater than 50%, message discriminator 620 may apply a label that the message came from message generator 610. In some embodiments, the threshold value may be updated.

At 740, a determination is made as to whether message discriminator 620 was correct. In some embodiments, this may be performed by providing a label associated with the message to message discriminator 620. The label may designate whether the message was created by message generator 610 or not, and message discriminator 620 can compare the label to its own determination to discern whether it was correct or not. In some embodiments, labels corresponding to messages created by message generator 610 may be "0," "false positive," or "sample." In some embodiments, messages not created by message generator 610 may be labeled "1," "captured," or "true."

At 750, message discriminator 620 can be re-trained or updated based on the determination. Back propagation may be used to update message discriminator 620. In response to each message and its corresponding label, message discriminator 620 may update the weights for each class. In some embodiments, if message discriminator 620 correctly identified a message as coming from message generator 610, message discriminator 620 may increase the weights associated with false positive message created by message generator 610. For example, the weights may be adjusted based on the detected features to more accurately determine whether messages were created by message generator 610 or are captured messages (e.g., messages captured in network 106). In some embodiments, message discriminator 620 may be re-trained after analyzing a certain number of messages.

At 760, message generator 610 may be re-trained or updated in response to message discriminator's 620 determination. Back propagation may be used to update message discriminator 620. For example, message generator 610 may maintain a set of weights representing message features. Message generator 610 may update the set of weights based on message discriminator's 620 label and the generated message's features. In some embodiments, message generator 610 may be re-trained after generating and receiving responses from message discriminator 620 for a certain number of messages. For example, each message may be formatted to contain a date and time field. Initially, message generator 610 may place random values in this field, and message discriminator 620 may detect that the values in this field do not correspond to actual dates and times, and thus the message was likely created by message generator 610. In response, message generator 610 may be updated to include valid date and time values in order to make it more difficult for message discriminator 620 to discern where the message came from.

As an example, message generator 610 may create a training message containing a sixteen digit, appearing to be a credit card number, but is not. Message discriminator 620 may analyze the message and generate a probability score of 60% that is greater than the 50% threshold. Next, message discriminator 620 is provided with the message's label (e.g., truth data). Message discriminator 620 can use this generated message and its label to re-train. For example, message discriminator 620 and/or message generator 610 may also be re-trained as a result of this process.

As another example, message discriminator 620 may receive a message that was not generated by message generator 610. These messages may be considered captured messages. Captured messages may have been generated by client device 104 and saved for later use once it reached network 106. The captured message may contain sensitive data, such as a real credit card number, or an active employee identifier. In this example, message discriminator 620 may analyze the message and predict with 70% confidence that the message came from message generator 610. Since this is greater than the 50% threshold, message discriminator 620 would apply a label designating that the message came from message generator 610. Message discriminator 620 may then receive the message's label that it was a captured message, and determine that its prediction was incorrect since it believed that the message was created by message generator 610. Message discriminator 620 may then be re-trained based on this determination. As stated above, the training process may involve updating a set of feature weights maintained by message discriminator 620. Since, in this example, message discriminator 620 was incorrect, features associated with the message would be used modify weights associated with message features to more accurately determine whether the message was a captured message. Message generator 610 may be re-trained or updated to increase its weights associated with the features of the message it created.

In applying method 700, message generator 610 may produce increasingly realistic messages. Similarly, message discriminator 620 may become more effective at detecting where each message originated. This has many technological benefits. First, message generator 610 may be used to create realistic training data sets that can be used to train both message discriminator 620 but also transformer model 110. Such operation is beneficial because training data is often built from actual data that has been saved for future use. A training data set may be constructed from actual messages sent from client device 104. However, sampling actual messages may not produce an equal distribution of sensitive data types. For example, it is likely that usernames are transmitted more frequently than social security numbers. Thus, a training set built upon actual messages will have more examples of usernames and fewer examples of social security numbers. As a result, sensitive data management system 102 would likely detect usernames with higher accuracy and frequency than social security numbers. To improve sensitive data management system's 102 and/or transformer model's 110 accuracy, message generator 610 can be leveraged to generate realistic messages that can be used to train transformer model 110 to improve its accuracy and to increase robustness.

Figure 8:
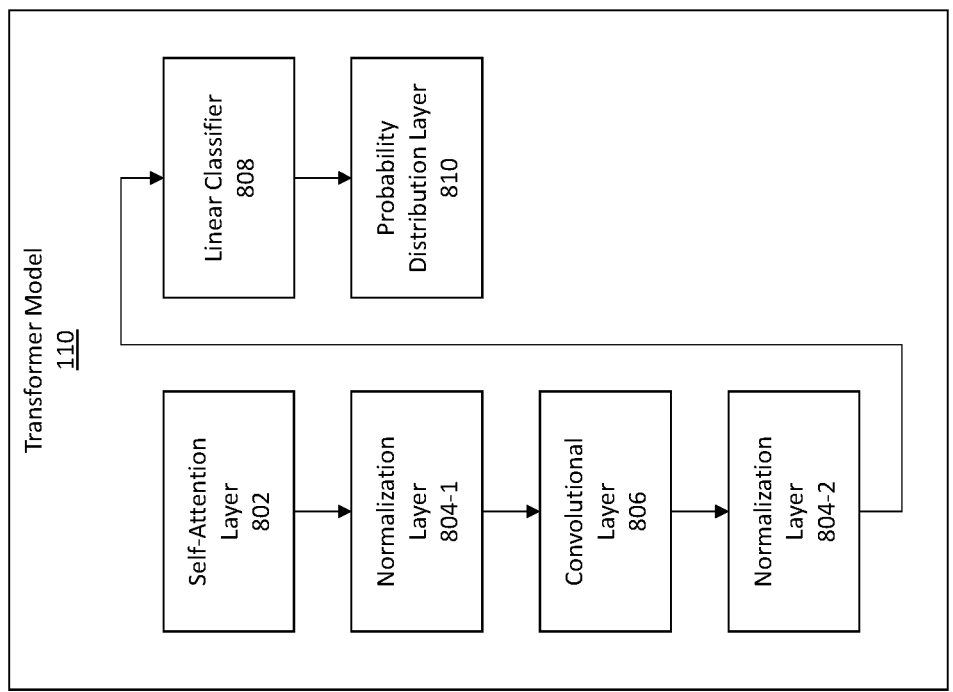
FIG. 8 depicts a block diagram of a transformer model, according to some embodiments.

FIG. 8 depicts a block diagram of a transformer model 110, according to some embodiments. Transformer model 110 may include self-attention layer 802, one or more normalization layers 804, convolutional layer 806, linear classifier 808, and/or probability distribution layer 810. Self-attention layer 802 may be configured to determine the importance or similarity of each part of a message to every other part. For example, a message may contain a username, password, and time value. Usernames and passwords may be linked, and thus more attention should be paid to them than the combination of a username and time or password and time. Transformer model 110 may have multiple self-attention layers 802. Multiple self-attention layers 802 may allow the importance of each message part to be computed in relation to every other part, in parallel. Such an architecture may decrease latency. Normalization layer 804 may be used to ensure that outputs of each stage are on the same scale. Transformer model 110 may be configured with multiple normalization layers 804. Convolutional layer 806 may consist of one or more filters applied to the output of self-attention layer 802 and normalization layers 804. Each filter within convolutional layer 806 may be designed to detect a certain feature within the input message. Linear classifier 808 may be applied to the output of convolutional layer 806 to detect sensitive data types. Linear classifier 808 may be able to identify as many sensitive data types as are stored at sensitive data database 114. Probability distribution layer 810 may be configured to take the output from linear classifier 808 and convert it into a probability distribution. Creating a probability distribution may allow the most likely classification to be easily selected. In some embodiments, probability distribution layer 810 may employ a softmax function.

Figure 9:
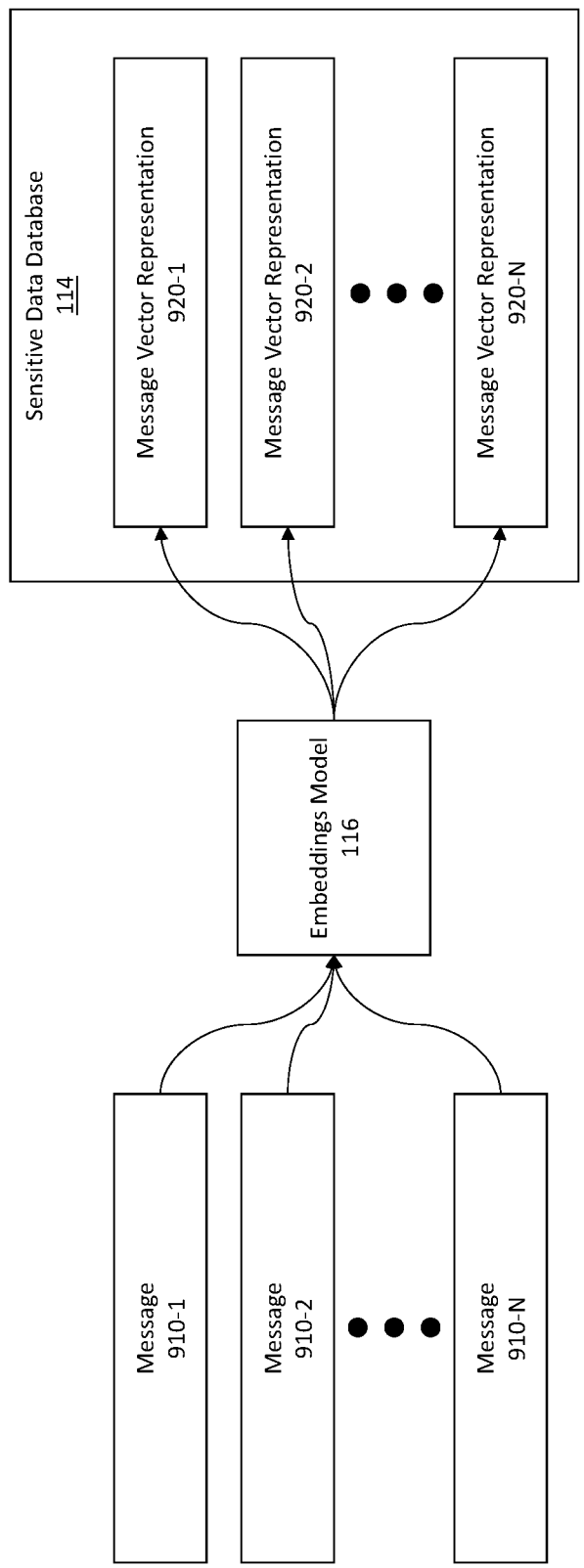
FIG. 9 depicts an environment for populating a sensitive data database, according to some embodiments.

FIG. 9 depicts an environment 900 for populating a sensitive data database 114, according to some embodiments. Sensitive data database 114 may be populated by using embeddings model 116. Embeddings model 116 receive messages 910 as an input, and produce message vector representations 920 as an output. Embeddings model 116 may write message vector representations 920 to sensitive data database 114. Message vector representations 920 may include a numerical vector representation of the text-based message 910.

Figure 10:
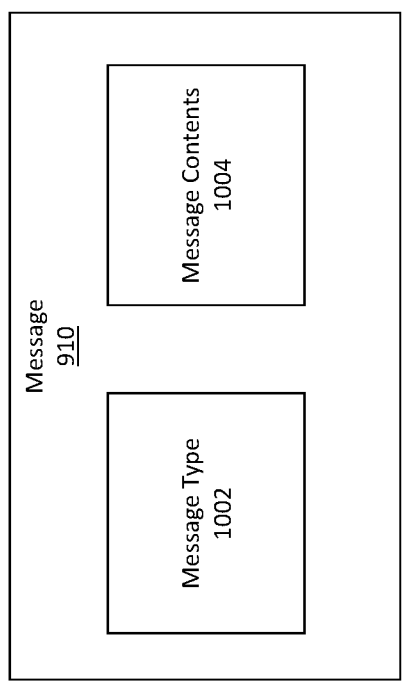
FIG. 10 depicts a block diagram of an example message, according to some embodiments.

FIG. 10 depicts a block diagram of an example message 910. Message 910 may include a message type 1002 and message contents 1004. Message type 1002 may be used to denote the category or structure of the message contents 1004. In some embodiments, the message type 1002 may be an HTTP GET request, an HTTP POST request, a general API request, source code, or a digital certificate. Message contents 1004 may refer to the data transmitted in message 910. Certain message contents 1004 may contain sensitive data. For example, message contents 1004 in an HTTP POST request message may contain a username and password. These message contents 1004 may be considered sensitive, and therefore sensitive data management system 102 may be used to detect their presence and apply a blocking policy.

Figure 11:
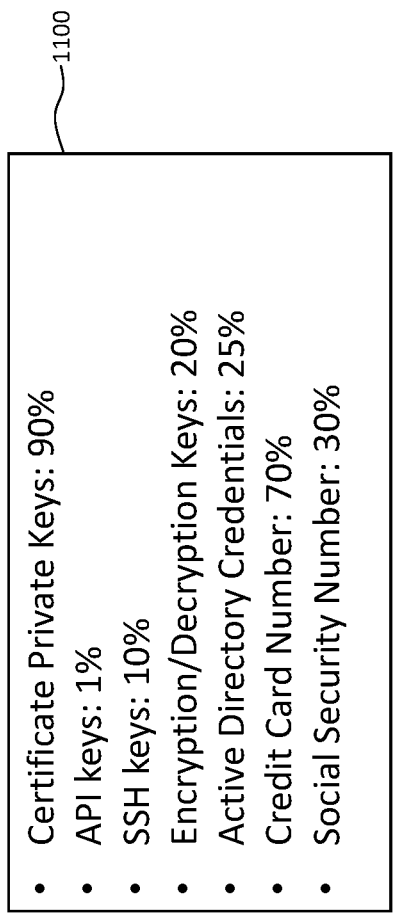
FIG. 11 depicts an example sensitive data report, according to some embodiments.

FIG. 11 depicts an example sensitive data report 1100, according to some embodiments. Sensitive data report 1100 may be generated by sensitive data management system 102 and/or transformer model 110. Sensitive data report 1100 may list each sensitive data type the message vector was compared to and/or the corresponding similarity. For example, the message vector may have been compared to seven sensitive data types: (1) certificate private keys; (2) API keys; (3) SSH keys; (4) encryption/decryption keys; (5) active director credentials; (6) credit card number; and (7) social security number. Each sensitive data type may have a similarity value to the message vector. The similarity value may be denoted as a percentage (e.g., 90%). In some embodiments, transformer model 110 may be configured to list certain sensitive data types, or sensitive data types with a corresponding similarity value or similarity score greater than a certain percentage. For example, sensitive data types with similarity values greater than 50% may be listed on sensitive data report 1100. This may be useful in a situation where there is uncertainty as to whether the message contains sensitive data, and so the message along with sensitive data report 1100 can be saved for later inspection. Sensitive data management system 102 may store sensitive data report 1100 in a database and/or generate one or more graphical user interfaces for client device 104 to view and/or display sensitive data report 1100.

Figure 12:
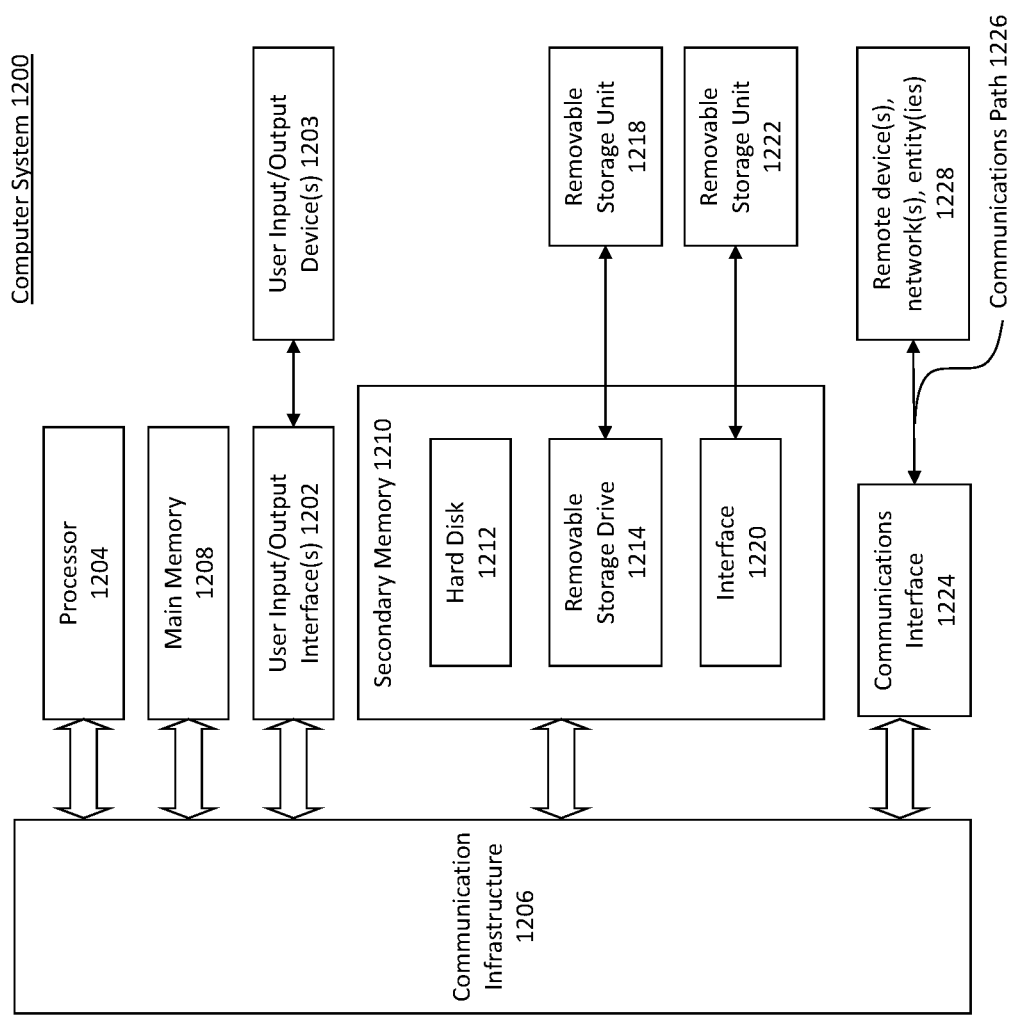
FIG. 12 depicts an example computer system useful for implementing various embodiments.

Various embodiments may be implemented, for example, using one or more well-known computer systems, such as computer system 1200 shown in FIG. 12. One or more computer systems 1200 may be used, for example, to implement any of the embodiments discussed herein, as well as combinations and sub-combinations thereof.

Computer system 1200 may include one or more processors (also called central processing units, or CPUs), such as a processor 1204. Processor 1204 may be connected to a communication infrastructure or bus 1206.

Computer system 1200 may also include user input/output device(s) 1203, such as monitors, keyboards, pointing devices, etc., which may communicate with communication infrastructure 1206 through user input/output interface(s) 1202.

One or more of processors 1204 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1200 may also include a main or primary memory 1208, such as random access memory (RAM). Main memory 1208 may include one or more levels of cache. Main memory 1208 may have stored therein control logic (e.g., computer software) and/or data.

Computer system 1200 may also include one or more secondary storage devices or memory 1210. Secondary memory 1210 may include, for example, a hard disk drive 1212 and/or a removable storage device or drive 1214. Removable storage drive 1214 may be a floppy disk drive, a magnetic tape drive, a compact disk drive, an optical storage device, tape backup device, and/or any other storage device/drive.

Removable storage drive 1214 may interact with a removable storage unit 1218. Removable storage unit 1218 may include a computer usable or readable storage device having stored thereon computer software (control logic) and/or data. Removable storage unit 1218 may be a floppy disk, magnetic tape, compact disk, DVD, optical storage disk, and/any other computer data storage device. Removable storage drive 1214 may read from and/or write to removable storage unit 1218.

Secondary memory 1210 may include other means, devices, components, instrumentalities or other approaches for allowing computer programs and/or other instructions and/or data to be accessed by computer system 1200. Such means, devices, components, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 may enable computer system 1200 to communicate and interact with any combination of external devices, external networks, external entities, etc. (individually and collectively referenced by reference number 1228). For example, communication interface 1224 may allow computer system 1200 to communicate with external or remote devices 1228 over communications path 1226, which may be wired and/or wireless (or a combination thereof), and which may include any combination of LANs, WANs, the Internet, etc. Control logic and/or data may be transmitted to and from computer system 1200 via communication path 1226.

Computer system 1200 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1200 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1200 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 12. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for sensitive data leakage protection, the method comprising:
   receiving a message having a destination residing outside of a secure network;
   determining that the message contains a potentially sensitive data component by applying a generative adversarial network (GAN) model to the message;
   transforming the message into a message vector, wherein the message vector is based on content of the message;
   determining, by a transformer model, that the potentially sensitive data component includes sensitive data by:
   applying the message vector to the transformer model;
   comparing the message vector to one or more vectors stored in a sensitive data database, wherein each of the one or more vectors corresponds to a type of sensitive data; and in response to the comparison, identifying a type of sensitive data;

applying a blocking policy to the message based on the type of sensitive data;

generating a sensitive data report including one or more sensitive data types respectively corresponding to each of the one or more vectors and a similarity value of each of the one or more vectors to the message vector; and generating a graphical user interface that includes the sensitive data report.

2. The computer implemented method of claim 1, wherein the GAN model comprises a message generator and a message discriminator, wherein the method further comprises:

generating, by the message generator, a false positive message;

determining, by the message discriminator, whether the false positive message was created by the message generator;

re-training the message generator based on whether the message discriminator correctly determined that the false positive message was created by the message generator; and re-training the message discriminator based on whether the message discriminator correctly determined that the false positive message was created by the message generator.

3. The computer implemented method of claim 1, wherein comparing the message vector to the one or more vectors stored in the sensitive data database further comprises:

determining a similarity value between the message vector and each of the one or more vectors stored in the sensitive data database.

4. The computer implemented method of claim 3, wherein each type of sensitive data has a corresponding similarity threshold, and wherein applying the blocking policy further comprises:

determining that a similarity value between the message vector and a vector stored in the sensitive data database is greater than the similarity threshold corresponding to the vector.

5. The computer implemented method of claim 3, wherein the similarity value is determined by applying a cosine similarity or nearest neighbor search.

6. The computer implemented method of claim 1, wherein the sensitive data comprises a credit card number, a social security number, a username, a password, a passport number, a driver's license number, or an account number.

7. The computer implemented method of claim 1, wherein applying the blocking policy comprises discarding the message, storing the message in a database, or removing the sensitive data component from the message.

8. A system, comprising:
a memory; and
at least one processor coupled to the memory and configured to:
receive a message having a destination residing outside of a secure network;
determine that the message contains a potentially sensitive data component by applying a generative adversarial network (GAN) model to the message;
transform, by a transformer model, the message into a message vector, wherein the message vector is based on content of the message;
determine, by the transformer model, that the potentially sensitive data component is sensitive by:

applying the message vector to the transformer model;
comparing the message vector to one or more vectors stored in a sensitive data database, wherein each of the one or more vectors corresponds to a type of sensitive data; and
in response to the comparison, identifying a type of sensitive data;
apply a blocking policy to the message based on the type of sensitive data;
generate a sensitive data report including one or more sensitive data types respectively corresponding to each of the one or more vectors and a similarity value of each of the one or more vectors to the message vector; and
generate a graphical user interface that includes the sensitive data report.

9. The system of claim 8, wherein the GAN model comprises a message generator and a message discriminator, wherein the at least one processor is further configured to:

generate, by the message generator, a false positive message;

determine, by the message discriminator, whether the false positive message was created by the message generator;

re-train the message generator based on whether the message discriminator correctly determined that the false positive message was created by the message generator; and re-train the message discriminator based on whether the message discriminator correctly determined that the false positive message was created by the message generator.

10. The system of claim 8, wherein to compare the message vector to the one or more vectors stored in the sensitive data database, the at least one processor is further configured to:

determine a similarity value between the message vector and each of the one or more vectors stored in the sensitive data database.

11. The system of claim 10, wherein each type of sensitive data has a corresponding similarity threshold, and wherein applying the blocking policy further comprises:

determining that a similarity value between the message vector and a vector stored in the sensitive data database is greater than the similarity threshold corresponding to the vector.

12. The system of claim 10, wherein the similarity value is determined by applying a cosine similarity or nearest neighbor search.

13. The system of claim 8, wherein the sensitive data comprises a credit card number, a social security number, a username, a password, a passport number, a driver's license number, or an account number.

14. The system of claim 9, wherein applying the blocking policy comprises discarding the message, storing the message in a database, or removing the sensitive data component from the message.

15. A non-transitory computer-readable device having instructions stored thereon that, when executed by at least one computing device, cause the at least one computing device to perform operations comprising:

receiving a message having a destination residing outside of a secure network;

determining that the message contains a potentially sensitive data component by applying a generative adversarial network (GAN) model to the message;

transforming, by a transformer model, the message into a message vector, wherein the message vector is based on content of the message;

determining, by the transformer model, that the potentially sensitive data component includes sensitive data by:

applying the message vector to the transformer model;

comparing the message vector to one or more vectors stored in a sensitive data database, wherein each of the one or more vectors corresponds to a type of sensitive data; and in response to the comparison, identifying a type of sensitive data;

applying a blocking policy to the message based on the type of sensitive data;

generating a sensitive data report including one or more sensitive data types respectively corresponding to each of the one or more vectors and a similarity value of each of the one or more vectors to the message vector; and generating a graphical user interface that includes the sensitive data report.

16. The non-transitory computer-readable device of claim 15, wherein the GAN model comprises a message generator and a message discriminator, wherein the operations further comprise:

generating, by the message generator, a false positive message;

determining, by the message discriminator, whether the false positive message was created by the message generator;

re-training the message generator based on whether the message discriminator correctly determined that the false positive message was created by the message generator; and re-training the message discriminator based on whether the message discriminator correctly determined that the false positive message was created by the message generator.

17. The non-transitory computer-readable device of claim 15, wherein comparing the message vector to the one or more vectors stored in the sensitive data database further comprises:

determining a similarity value between the message vector and each of the one or more vectors stored in the sensitive data database.

18. The non-transitory computer-readable device of claim 17, wherein each type of sensitive data has a corresponding similarity threshold, and wherein applying the blocking policy further comprises:

determining that a similarity value between the message vector and a vector stored in the sensitive data database is greater than the similarity threshold corresponding to the vector, wherein the similarity value is determined by applying a cosine similarity or nearest neighbor search.

* * * * *